Patented Aug. 8, 1939

2,168,376

UNITED STATES PATENT OFFICE 2,168,376

PROCESS FOR PRODUCING BUTTER

Peter A. van der Meulen and David Levowitz, New Brunswick, N. J.

No Drawing. Application September 21, 1938, Serial No. 230,986

8 Claims. (Cl. 99—119)

The invention herein disclosed relates to the production of butter from milk or cream as described in the copending application for patent, Serial No. 47,632, filed October 31, 1935. This application for patent forms a continuation in part of that earlier filed application.

In the production of butter, prior to the invention herein disclosed, cream containing approximately forty percent butter fat and five and five-tenths percent serum solids has been obtained from milk. Commonly, the cream is pasteurized by heating to a temperature of approximately 142° F. and maintained at that temperature for a period of thirty minutes. It is then cooled and treated in well known ways depending upon the character of the cream and the desired characteristics of the butter. The cream is then churned. During the churning lumps of butter fat, containing more or less of the serum solids and water, are formed. The butter so formed is washed one or more times with water to remove some of the serum solids, which, if not removed, produce undesirable flavor in the butter when it is placed in storage. The butter removed from the churn is worked to improve its texture, to incorporate salt therein and to incorporate coloring matter if that be desirable.

Many theories have been expounded to explain the production of butter by churning and some attempts have been made to produce butter without churning. Churns are usually large and expensive and the production of butter by churning is a slow, laborious and intermittent process. In consequence it is desirable that the churning be eliminated and some process substituted that does not require churning, preferably one that is capable of continuous operation. This is the aim and object of the invention herein disclosed.

After considerable investigation of the subject of the formation of butter from cream, it appears that the first step in the churning process leads to the production of a foam containing a high concentration of fat globules and in the next step a large portion of the milk serum drains from the foam. Thereafter, due to the mechanical action of the churn, the stabilizing films of some of the less stable fat globules are broken, liberating the oil from these less stable globules. The more stable fat globules are, however, left substantially unchanged. The free oil produced by the rupture of the least stable globules forms a cementing material for the stable globules.

In consequence, to produce butter it is necessary to provide a process, and in accordance with this invention such a process is provided, by which the less stable fat globules are broken down and the more stable globules are maintained substantially unchanged. This is accomplished by the process of the invention without the necessity of churning. The process contemplates the obtaining of cream from milk in the usual and known manner. The concentration of milk is carried out by centrifugation to obtain a cream having a suitable percentage of butterfat, between thirty to fifty-five percent of butterfat. This cream, depending upon its nature and the characteristics desired in the butter to be produced, is treated in a manner well known in the art.

To the cream there is now added a suitable quantity of water at a suitable temperature to obtain the desired dilution of the cream and the desired temperature of the water-cream mixture. Experiments have shown that the volume of water added may vary in the ratio of water to cream between one part of water to one part of cream and ten parts of water to one part of cream. The desired temperature of the water-cream mixture is determined by the extent of the dilution of the cream and may vary between 115° F. and 180° F. The water-cream mixture at the proper temperature is run through a separator that is adjusted to yield eighty percent or more of butterfat. The product that issues directly from the separator is butter. This butter is cooled, and the extent to which it is cooled depends upon whether the butter is to be further processed in accordance with known processing of butter, such as whether the butter is to be salted, printed, whipped, etc.

The addition of water to the cream greatly reduces the concentration of the serum solids. This is accomplished by the dilution without affecting the stability of the fat globules to any material extent. The protein material that stabilizes the fat globules is removed only with great difficulty and theoretically, at least, about 0.3% of protein material is sufficient to stabilize all the fat globules in an 80% cream. The elevated temperature of the water-cream mixture aids in setting free some of the butterfat and prepares the less stable globules for the mechanical action of the separator which releases the butterfat of these less stable globules and brings the butterfat into the necessary relation to the more stable globules to produce butter. The degree of stability and the ratio of stabilized to broken down globules, in other words the texture of the butter, may thus be controlled by the degree of the dilution of the cream and the temperature of the water-cream mixture.

A specific example of the production of butter by this process is as follows: Milk is centrifuged as hereinbefore stated to a concentration of from thirty to fifty-five percent butterfat. If a sour cream be used, it is cultured at a temperature of about 72° F. with a single organism or a combination of organisms in the usual and well known manner. The cream is then neutralized to the proper titratable acidity, that is from 0.20 to 0.30% calculated as lactic acid by the standard dairy procedure, using the phenol phthalein indicator.

To the cream hot water is added of such temperature to bring the water-cream mixture to a suitable temperature. If nine parts of water for each part of cream is added, for example, the mixture is brought to a temperature between 155° and 160° F. if a small separator is to be used. This water-cream mixture is then run through the separator.

The separator used is a standard separator modified as follows: The inlet to the separator bowl is constricted to reduce the flow to approximately one-half the normal flow. The cream screw is adjusted to yield 80% or more butterfat and the cream receptacle together with the spout is modified such that the very viscous product flows easily. This may be accomplished by affixing two large spouts, oppositely placed, on the cream receptacle of the separator. When the separator is so modified and the water-cream mixture run through it, butter issues directly from the separator. If the process is to be carried out on a large scale, a cooling drum and scraper may be inserted between the spouts and the receptacle used for collecting the butter. Preferably the spout of the separator is maintained at a temperature, substantially 130° F., to cause the butter to flow freely through the spout.

From the foregoing description of the process of this invention, it will be apparent to those skilled in the art that there is provided a very much simplified process for producing butter; a process in which the churning apparatus and the churning heretofore employed are eliminated, and a process that is capable of continuous operation. In addition the cost of producing butter is materially reduced by this process; the losses of butterfat are greatly reduced compared to the losses in the churning process; and the texture, flavor and keeping qualities of the butter produced are better. Furthermore, by the dilution, bacteria and undesirable serum solids are removed. This greatly reduces the tendency of the butter to spoil, developing a so-called "cheesy" or other undesirable flavor. The necessary handling of the butter is minimized and its contact with metal is largely avoided. Finally, the oiliness of the butter may be controlled so as to avoid a greasy butter and by this process good butter may be obtained, in many cases, from creams, sweet or sour, pasteurized or non-pasteurized, which are considered sub-standard for the churning process.

It will be obvious that various changes may be made by those skilled in the art in the steps of the process described in detail above within the principle and scope of the invention as expressed in the appended claims.

We claim:

1. In the process for producing butter, the steps including mixing cream and water to form a mixture of cream and water, and subjecting the mixture of cream and water at a temperature between 115 and 180 degrees F. to the action of a centrifugal separator adjusted to deliver a product of the consistency of butter, whereby butter is obtained directly from the separator.

2. In the process for producing butter, the steps including mixing cream and water to form a mixture of cream and water containing from one to ten parts of water to each part of cream, and subjecting the mixture of cream and water at a temperature between 115 and 180 degrees F. to the action of a centrifugal separator adjusted to deliver a product of the consistency of butter, whereby butter is obtained directly from the separator.

3. In the process for producing butter, the steps including mixing cream and water to form a mixture of cream and water, and subjecting the mixture of cream and water so formed to a temperature between 115 and 180 degrees F. to the action of a centrifugal separator adjusted to deliver a product of the consistency of butter and containing at least eighty percent fat, whereby butter is obtained directly from the separator.

4. In the process for producing butter, the steps including mixing cream and water to form a mixture of cream and water containing from one to ten parts of water to each part of cream, and subjecting the mixture of cream and water at a temperature between 115 and 180 degrees F. to the action of a centrifugal separator adjusted to deliver a product of the consistency of butter and containing at least eighty percent fat, whereby butter is obtained directly from the separator.

5. In the process for producing butter, the steps comprising mixing cream and water to form a mixture of cream and water, maintaining the temperature of the mixture between 115 and 180 degrees F. and subjecting the mixture to the action of a centrifugal separator adjusted to deliver a product containing at least eighty percent fat, whereby butter is obtained directly from the separator.

6. In the process for producing butter, the steps comprising mixing cream and water to form a mixture of cream and water, maintaining the temperature of the mixture between 115 and 180 degrees F., subjecting the mixture to the action of a centrifugal separator adjusted to deliver a product containing at least eighty percent fat, whereby butter is obtained directly from the separator, and maintaining the outlet of the separator at a temperature of approximately 130° F.

7. In the process for producing butter, the steps including mixing cream and water to form a mixture of cream and water containing from one to ten parts of water to each part of cream, subjecting the mixture of cream and water at a temperature of between 115 and 180 degrees F. to the action of a centrifugal separator adjusted to deliver a product of the consistency of butter whereby butter is obtained directly from the separator and thereafter mixing salt with the butter.

8. In the process for producing butter, the steps including mixing cream and water to form a mixture of cream and water containing from one to ten parts of water to each part of cream, maintaining the temperature of the mixture between 115 and 180 degrees F. and subjecting the mixture to the action of a centrifugal separator adjusted to deliver a product containing eighty percent fat, whereby butter is obtained directly from the separator, and maintaining the outlet of the separator at a temperature of approximately 130° F.

PETER A. van der MEULEN.
DAVID LEVOWITZ.